Oct. 12, 1937. C. C. DIXON 2,095,596
FERTILIZER DISTRIBUTOR
Filed Oct. 28, 1936 3 Sheets-Sheet 1

Inventor
C. C. Dixon
By Clarence A. O'Brien and Hyman Berman
Attorneys

Oct. 12, 1937.  C. C. DIXON  2,095,596
FERTILIZER DISTRIBUTOR
Filed Oct. 28, 1936  3 Sheets-Sheet 2
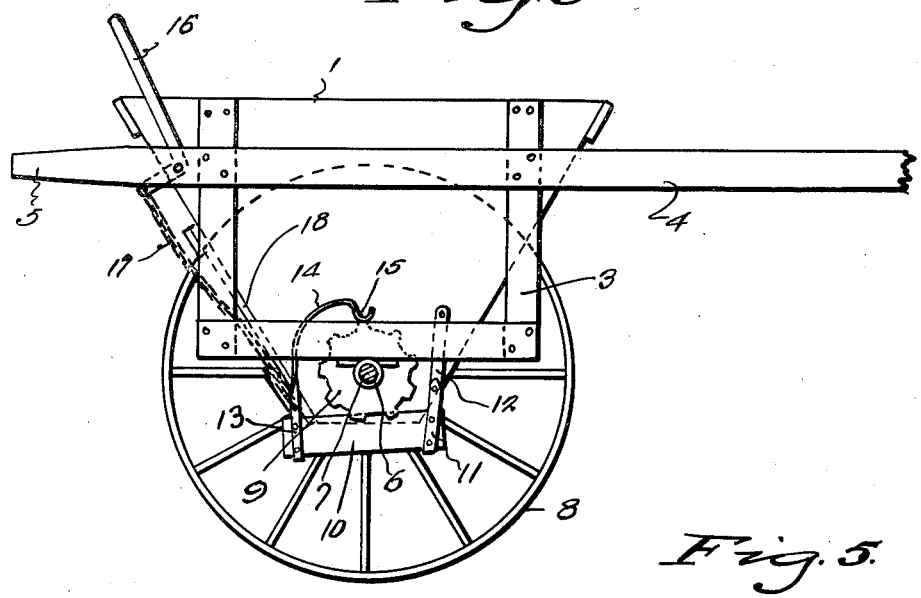
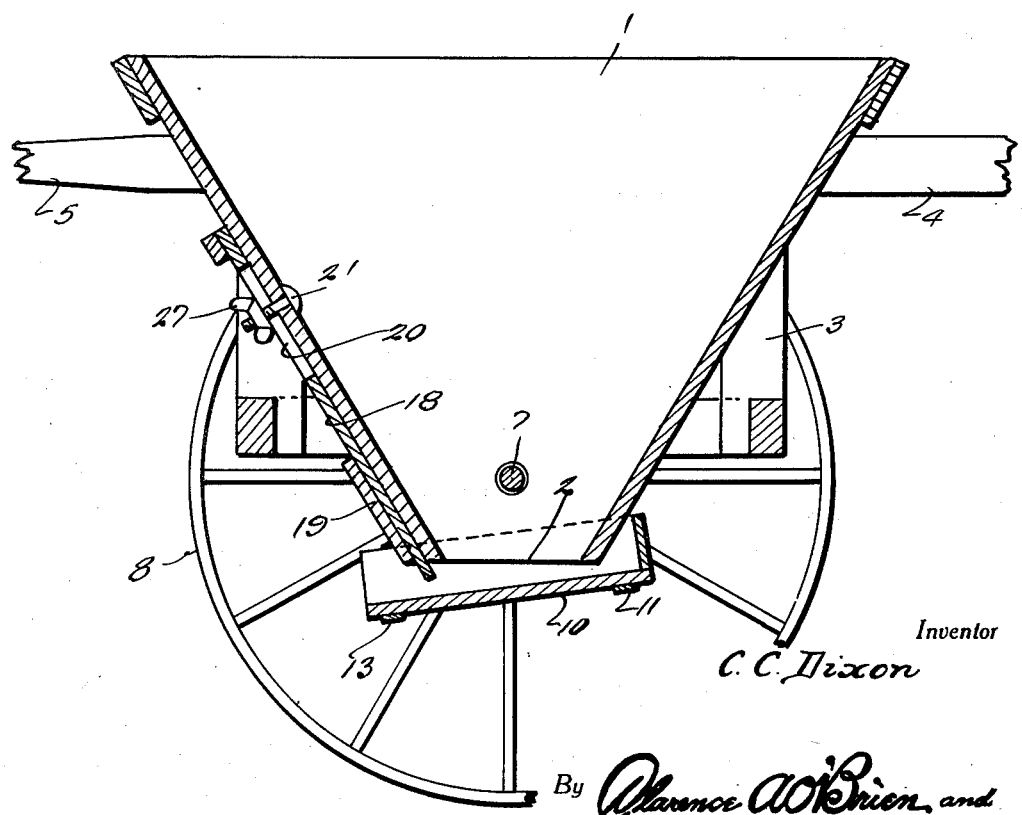
Inventor
C. C. Dixon
By Clarence A. O'Brien and
Hyman Berman
Attorneys Oct. 12, 1937.  C. C. DIXON  2,095,596
FERTILIZER DISTRIBUTOR
Filed Oct. 28, 1936  3 Sheets-Sheet 3
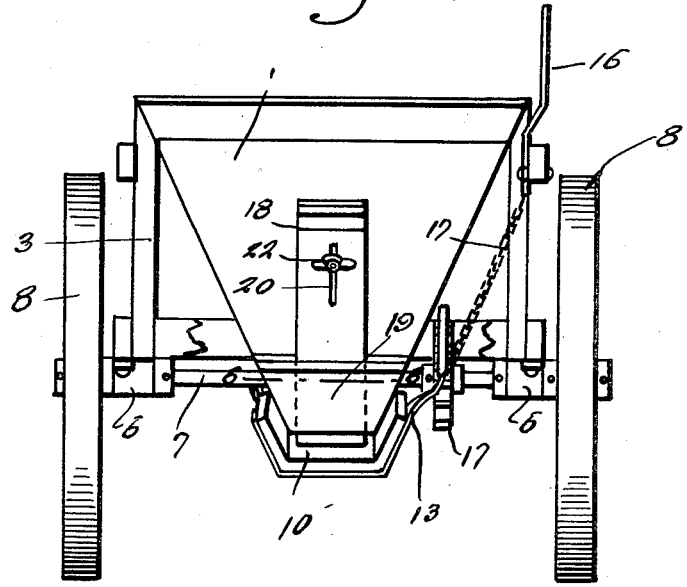
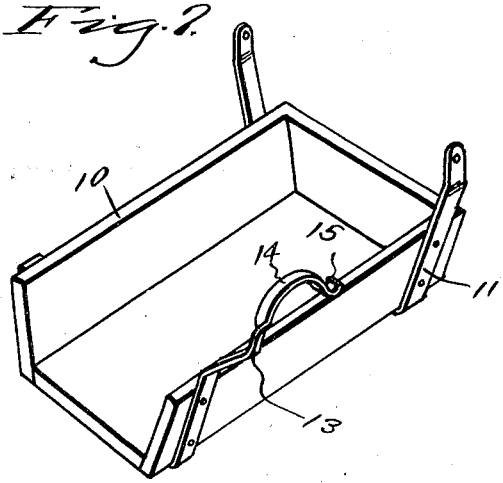
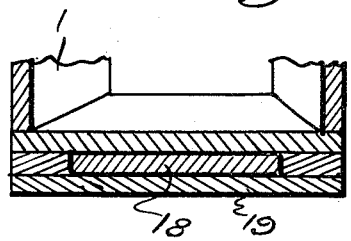
Inventor
C. C. Dixon
By Clarence A. O'Brien
Hyman Berman
Attorneys Patented Oct. 12, 1937

2,095,596

UNITED STATES PATENT OFFICE 2,095,596

FERTILIZER DISTRIBUTOR

Charlie Clifton Dixon, Alliance, N. C.

Application October 28, 1936, Serial No. 108,069

1 Claim. (Cl. 221—142)

The present invention relates to new and useful improvements in fertilizer distributors and has for one of its important objects to provide, in a manner as hereinafter set forth, a device of this character embodying a novel construction, combination and arrangement of parts through the medium of which the fertilizer may be rapidly but uniformly discharged with a minimum of labor.

Another very important object of the invention is to provide a distributor of the aforementioned character embodying novel means for regulating or controlling the discharge of the fertilizer.

Other objects of the invention are to provide a fertilizer distributor of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts through the several views, and wherein:

Figure 3 is an elevational view, looking at the other side of the invention.

Figure 4 is a rear elevational view of the device with parts broken away.

Figure 5 is a view in vertical longitudinal section through the machine, taken substantially on the line 5—5 of Figure 1.

Figure 6 is a fragmentary view in a horizontal section, taken substantially on the line 6—6 of Figure 4.

Figure 7 is a detail view in perspective of the vibrating discharge chute.

Figure 1:
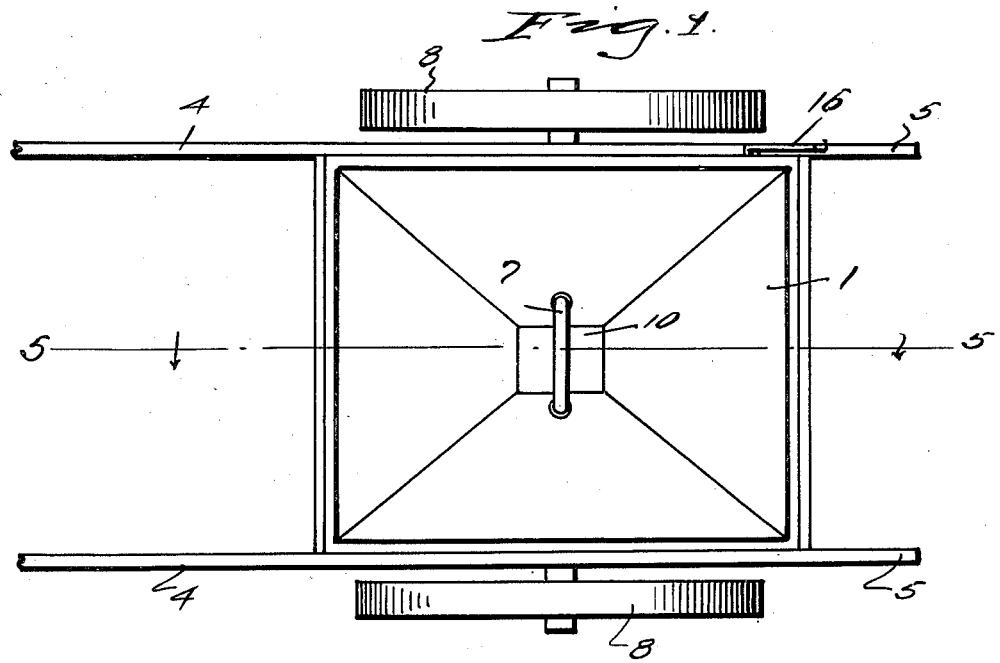
Figure 1 is a top plan view of a fertilizer distributor constructed in accordance with the present invention.
Figure 2:
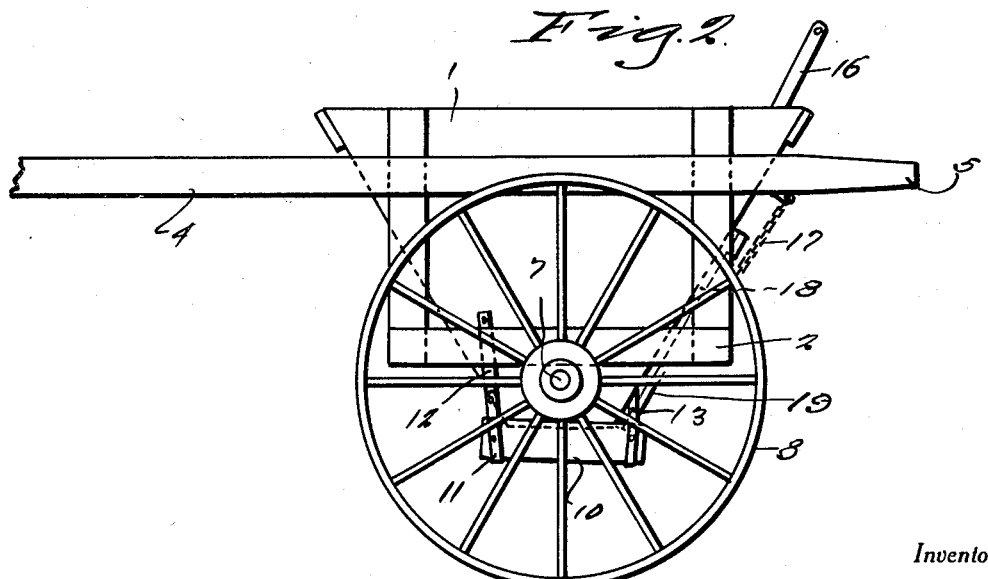
Figure 2 is an elevational view, looking at one side of the invention.

Referring now to the drawings in detail, it will be seen that the embodiment of the invention which has been illustrated comprises a hopper 1 for the reception of the fertilizer, said hopper being of any suitable dimensions and material. As best seen in Figure 5 of the drawings, the hopper 1 is open at its bottom, as at 2, for the disclosure of the fertilizer by gravity. The hopper 1 is mounted in a suitable frame structure 3 on the opposite sides of which spaced longitudinally extending shafts or handle bars 4 are secured. It will be noted that the handle bars 4 project rearwardly a slight distance beyond the hopper 1. The bars 4 terminate in handle portions 5 at both ends.

Suitable bearings 6 are mounted beneath the frame structure 3 and journalled therein in an axle 7 which extends through the lower portion of the hopper 1. The supporting wheels 8 are mounted on the end portions of the axle 7, one of said wheels being fixed thereto for rotating said axle as the distributor travels over the ground. Also fixed on the axle 7, adjacent one side of the hopper 1, is a star wheel or the like 9 the purpose of which will be presently set forth.

Suspended beneath the hopper 1 for receiving the fertilizer therefrom is a rearwardly inclined vibrating discharge chute 10 which is open at its rear end. The discharge chute 10 is mounted in a substantially U-shaped hanger 11 secured to the forward end portion of said discharge chute, said hanger being pivotally connected to brackets 12 on the hopper 1. Mounted on the forward end portions of the discharge chute 10 is an angular arm 13 having a curved portion 14 terminating in a reversely curved end portion 15 which is adapted to ride on the star wheel 9 in a manner to support and vibrate the free end of the discharge chute 10.

The reference numeral 16 designates a hand operated bell crank lever which is connected by a chain 17 to the rear end of the discharge chute 10.

Slidably mounted on the rear of the hopper 1 is a gate 18 which extends downwardly into the chute 10 for regulating the flow of fertilizer from said chute. The regulating or control gate 18 is mounted in a suitable guide structure 19 which is provided therefor on the hopper 1. The gate 18 is provided in its upper portion with a vertical slot 20 which accommodates a bolt 21 in the hopper 1. A wing nut 22 is threaded on the bolt 21 for frictionally securing the gate 18 in adjusted position.

It is thought that the operation of the device will be readily apparent from a consideration of the foregoing. The fertilizer is, of course, placed in the hopper 1 and falls by gravity into the discharge chute 10. With the discharge chute 10 in lowered position and the arm 13 resting on the star wheel 9, the device is pulled over the ground and as the star wheel 9 rotates with the axle 7 the chute 10 will be vibrated and cause the fertilizer to be discharged therefrom freely and uniformly. By raising or lowering the gate 18 the flow of fertilizer from the discharge chute 10 may be conveniently controlled. Through the medium of the hand lever 16 and the chain 17, the free rear end of the chute 10 may be raised to shut off the discharge of the fertilizer. This operation also raises the arm 13 out of engagement with the star wheel 9.

It is believed that the many advantages for a fertilizer distributor constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

A fertilizer distributor comprising a hopper for the reception of fertilizer, a rotatable shaft extending through the lower portion of the hopper, an inclined discharge chute pivotally mounted at one end beneath the hopper for receiving the fertilizer therefrom, and means operatively connecting said discharge chute to the shaft for vibrating said discharge chute upon rotation of the shaft, said means including a star wheel fixed on the shaft, and an arm mounted on the other end of the discharge chute, said arm comprising a curved portion terminating in a reversely curved free end portion adapted to ride on the star wheel for supporting the discharge end of the chute on said star wheel.

CHARLIE C. DIXON.